US010922072B1

(12) United States Patent
Chouinard (10) Patent No.: US 10,922,072 B1
(45) Date of Patent: Feb. 16, 2021

(54) APPARATUS, SYSTEM, AND METHOD FOR SEAMLESS AND REVERSIBLE IN-SERVICE SOFTWARE UPGRADES (71) Applicant: Juniper Networks, Inc., Sunnyvale, CA (US)

(72) Inventor: Luc Chouinard, Holden, MA (US)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 16/423,009

(22) Filed: May 25, 2019

(51) Int. Cl.
  *G06F 9/445* (2018.01)
  *G06F 8/656* (2018.01)
(52) U.S. Cl.
  CPC .................. *G06F 8/656* (2018.02)
(58) Field of Classification Search
  CPC ........................................... G06F 8/656
  USPC ................................. 717/168–178
  See application file for complete search history.

(56) References Cited

U.S. PATENT DOCUMENTS

| 6,996,817 | B2 | 2/2006 | Birum et al. |
| 9,122,558 | B2 | 9/2015 | Ewington et al. |
| 10,101,993 | B2 * | 10/2018 | Siegmund ........... G06F 11/3476 |
| 2012/0331454 | A1 | 12/2012 | Cross et al. |

* cited by examiner

*Primary Examiner* — Chuck O Kendall
(74) *Attorney, Agent, or Firm* — FisherBroyles, LLP (57) ABSTRACT

A disclosed method may include (1) detecting an in-service software upgrade that is to upgrade a first version of an operating system to a second version of the operating system and (2) performing the in-service software upgrade by (A) constructing a second software stack for the second version while a first software stack for the first version is active, wherein the first software stack and the second software stack (I) share one or more filesystem components in common and (II) differ from one another with respect to at least one filesystem component, (B) identifying one or more active processes that are currently managed by the first version, and (C) deactivating the first version and activating the second version such that management of the active processes is transitioned from the first version to the second version without rebooting. Various other apparatuses, systems, and methods are also disclosed.

19 Claims, 8 Drawing Sheets

```
                        Run-Time Report
                              600
------------------------------------------------------------
**************************************************

ACTIVE PROCESSES:

Process 502(1)
                        Process 502(2)
                        Process 502(3)

AFFECTED ACTIVE PROCESSES:

Process 502(3)

UNAFFECTED ACTIVE PROCESSES:

Process 502(1)
                        Process 502(2)

APPARATUS, SYSTEM, AND METHOD FOR SEAMLESS AND REVERSIBLE IN-SERVICE SOFTWARE UPGRADES

BACKGROUND

Computing devices may employ software that occasionally needs updating to fix certain bugs and/or improve performance. For example, a network device may include and/or execute an operating system that manages certain hardware and/or software resources. In this example, the network device may receive a software upgrade that is intended to patch a newly discovered security vulnerability, improve the operating system's performance, and/or provide support for new software across multiple platforms running the same operating system.

Unfortunately, a traditional software upgrade may involve modifying the existing software stack of the operating system. This modification to the software stack may complicate the process of rolling back the software upgrade and/or transitioning to an earlier version of the operating system. Additionally or Alternatively, a traditional software upgrade may force the network device to shut down and reboot, thereby resulting in a certain amount of downtime during which the network device is unable to forward traffic. Such downtime may be an undesirable but necessary side effect of the traditional software upgrade.

The instant disclosure, therefore, identifies and addresses a need for additional and improved apparatuses, systems, and methods for seamless and reversible in-service software upgrades.

SUMMARY

As will be described in greater detail below, the instant disclosure generally relates to apparatuses, systems, and methods for seamless and reversible in-service software upgrades. In one example, a method for accomplishing such a task may include (1) detecting an in-service software upgrade that is to upgrade a first version of an operating system to a second version of the operating system on a computing device, (2) performing the in-service software upgrade on the computing device by (A) constructing a second software stack for the second version of the operating system while a first software stack for the first version of the operating system is active on the computing device, wherein the first software stack and the second software stack (I) share one or more filesystem components in common and (II) differ from one another with respect to at least one filesystem component, (B) identifying one or more active processes that are currently managed by the first version of the operating system on the computing device, and (C) deactivating the first version of the operating system and activating the second version of the operating system such that management of the active processes is transitioned from the first version of the operating system to the second version of the operating system without rebooting the computing device.

Similarly, a system that implements the above-identified method may include a physical processing device configured to execute various modules stored in memory. In one example, this system may include and/or execute (1) a detection module that detects an in-service software upgrade that is to upgrade a first version of an operating system to a second version of the operating system on a computing device and (2) an upgrade module that performs the in-service software upgrade on the computing device by way of (A) a stack module that constructs a second software stack for the second version of the operating system while a first software stack for the first version of the operating system is active on the computing device, wherein the first software stack and the second software stack (I) share one or more filesystem components in common and (II) differ from one another with respect to at least one filesystem component, (B) an identification module that identifies one or more active processes that are currently managed by the first version of the operating system on the computing device, and (C) an activation module that deactivates the first version of the operating system and activates the second version of the operating system such that management of the active processes is transitioned from the first version of the operating system to the second version of the operating system without rebooting the computing device.

Additionally or alternatively, an apparatus that implements the above-identified method may include a storage device that stores a first version of an operating system that runs on a computing device. In one example, the apparatus may also include a physical processing device that is communicatively coupled to the storage device. In this example, the physical processing device may (1) detects an in-service software upgrade that is to upgrade a first version of an operating system to a second version of the operating system on a computing device and (2) performs the in-service software upgrade on the computing device by (A) constructing a second software stack for the second version of the operating system while a first software stack for the first version of the operating system is active on the computing device, wherein the first software stack and the second software stack (I) share one or more filesystem components in common and (II) differ from one another with respect to at least one filesystem component, (B) identifying one or more active processes that are currently managed by the first version of the operating system on the computing device, and (C) deactivating the first version of the operating system and activating the second version of the operating system such that management of the active processes is transitioned from the first version of the operating system to the second version of the operating system without rebooting the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for seamless and reversible in-service software upgrades. As will be explained in greater detail below, embodiments of the instant disclosure may construct and/or maintain separate software stacks for different versions of an operating system. For example, embodiments of the instant disclosure may construct a software stack for an upgraded version of an operating system while another software stack for an outdated version of the operating system is actively running on a computing device. These separate software stacks may share some filesystem components but differ in others. These embodiments may maintain these separate software stacks in connection with the different versions of the operating system.

As an example, these embodiments may enable the computing device to transition from the outdated version of the operating system to the upgraded version by first stopping all the active affected processes managed by the outdated version of the operating system. Upon doing so, these embodiments may then deactivate the outdated version's software stack and activate the upgraded version's software stack such that management of those active affected processes is assumed by the upgraded version's software stack. This deactivation of the outdated version's software stack and activation of the upgraded version's software stack may be achieved without rebooting the computing device by stopping those active processes that are affected by the transition from the outdated version to the upgraded version and then restarting the same under the upgraded version's software stack.

By doing so, these embodiments may facilitate and/or provide various advantages and/or improvements over traditional software upgrade technology. For example, these embodiments may be able to seamlessly upgrade the operating system of the computing device without requiring the computing device to shut down and/or reboot and/or without modifying the outdated version's software stack. By doing so, these embodiments may eliminate and/or minimize any performance delays and/or downtime experienced by the computing device as a result of the in-service software upgrade. Additionally or alternatively, these embodiments may be able to rollback, reverse, and/or undo the upgrade with ease and/or without modification to the upgraded version's software stack.

The following will provide, with reference to FIGS. 1, 2, 4, 5, and 7, detailed descriptions of exemplary apparatuses, systems, and corresponding implementations for seamless and reversible in-service software upgrades. Detailed descriptions of corresponding computer-implemented methods will be provided in connection with FIG. 3. Detailed descriptions of an exemplary portion of a run-time report will be provided in connection with FIG. 6. In addition, detailed descriptions of an exemplary computing system for carrying out these methods will be provided in connection with FIG. 8.

Figure 1:
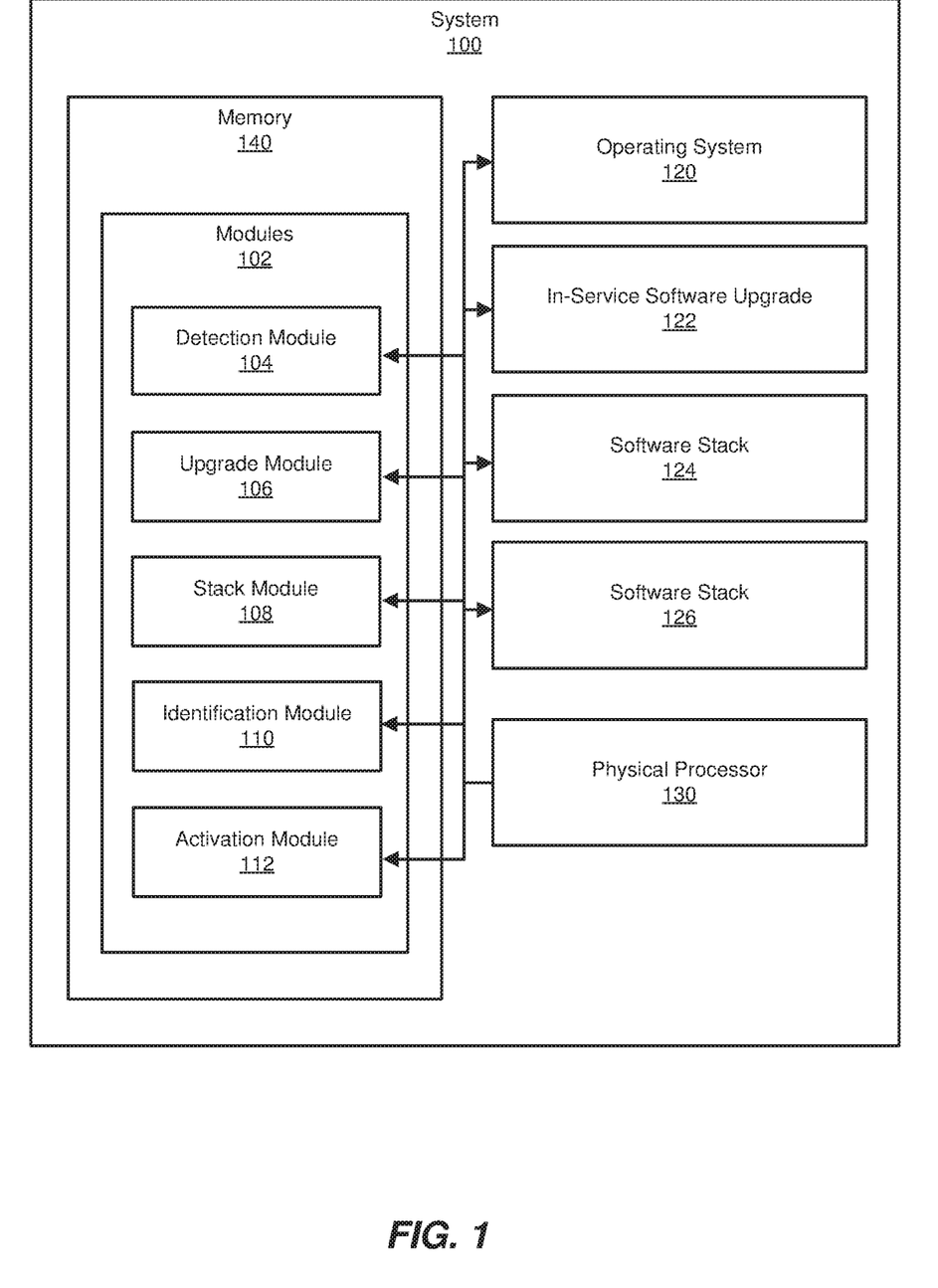
FIG. 1 is a block diagram of an exemplary system for seamless and reversible in-service software upgrades.

FIG. 1 shows an exemplary system 100 that facilitates seamless and reversible in-service software upgrades. As illustrated in FIG. 1, system 100 may include one or more modules 102 for performing one or more tasks. As will be explained in greater detail below, modules 102 may include a detection module 104, an upgrade module 106, a stack module 108, an identification module 110, and/or an activation module 112. Although illustrated as separate elements, one or more of modules 102 in FIG. 1 may represent portions of a single module or application (such as an operating system, a processing application, a file system, and/or a network application) running on a processing device, a routing engine, a field-replaceable unit, a packet forwarding engine, and/or any other suitable component of a network device. For example, upgrade module 106 may include and/or represent a combination of stack module 108, identification module 110, and/or activation module 112.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or computing device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate seamless and reversible in-service software upgrades. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include and/or involve one or more operating systems, such as operating system 120. In some examples, operating system 120 may manage certain hardware and/or software resources of a computing device. In one example, operating system 120 may be embodied as and/or deployed in different versions. For example, operating system 120 may be installed and/or run as a first version and then be updated and/or run as a second version. Examples of operating system 120 include, without limitation, JUNOS, LINUX, FREEBSD, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

As illustrated in FIG. 1, exemplary system 100 may further include and/or involve one or more in-service software upgrades, such as in-service software upgrade 122. In some examples, in-service software upgrade 122 may be programmed and/or configured to update and/or upgrade operating system 120 from one version to another. In one example, in-service software upgrade 122 may include and/or represent a software update, fix, patch, and/or upgrade that is performed on a computing device. In this example, in-service software upgrade 122 may be implemented without forcing the computing device to shut down and reboot. In other words, in-service software upgrade 122 may enable the computing device to update and/or upgrade its operating system without re-initializing the hardware via the Basic Input/Output System (BIOS). Additionally or alternatively, in-service software upgrade 122 may be implemented without modifying to the software stack of the version being upgraded.

As illustrated in FIG. 1, exemplary system 100 may additionally include and/or involve one or more software stacks, such software stacks 124 and 126. In some examples, software stack 124 may correspond to and/or represent part of a first version of operating system 120. In such examples, software stack 126 may correspond to and/or represent part of a second version of operating system 120. In one example, software stacks 124 and 126 may each include and/or represent various filesystem components (such as files, filesystems-in-a-file, etc.). Additionally or alternatively, software stacks 124 and 126 may each be an immutable full root software stack that is maintained in memory after the transition from one version of operating system 120 to another.

Figure 2:
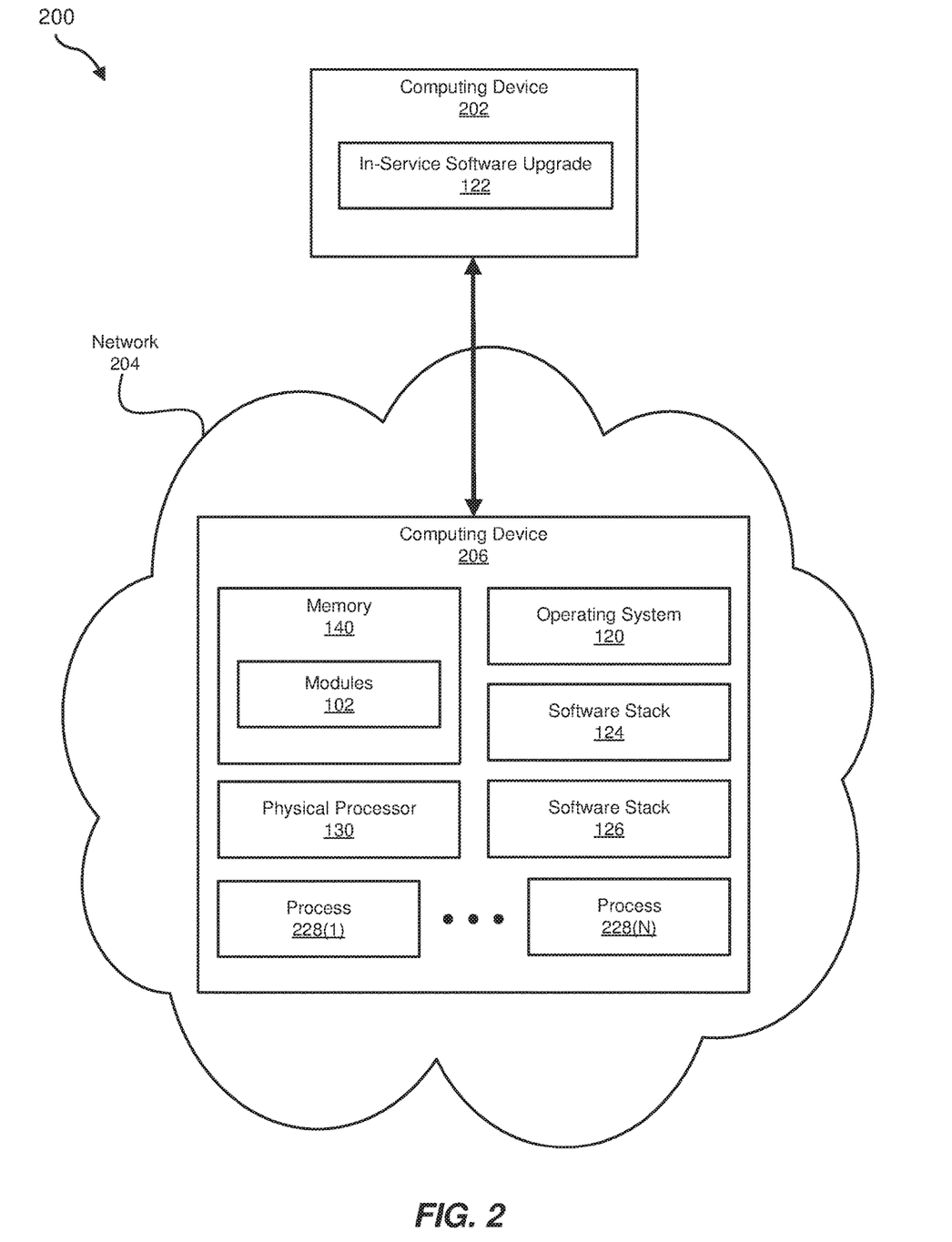
FIG. 2 is a block diagram of an exemplary system for seamless and reversible in-service software upgrades.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between a computing device 202 and/or a computing device 206. In one example, computing device 206 may include and/or incorporate memory 140 and physical processor 130. In this example, physical processor 130 may execute one or more of modules 102 stored in memory 140 for the purpose of facilitating seamless and reversible in-service software upgrades.

For example, and as will be described in greater detail below, one or more of modules 102 may cause computing device 206 to (1) detect in-service software upgrade 122 that is to upgrade a first version of operating system 120 to a second version of operating system 120 on computing device 206 and (2) perform in-service software upgrade 122 on computing device 206 by (A) constructing software stack 126 for the second version of operating system 120 while software stack 124 for the first version of operating system 120 is active on computing device 206, wherein software stacks 124 and 126 (I) share one or more filesystem components in common and (H) differ from one another with respect to at least one filesystem component, (B) identifying one or more active processes 228(1)-(N) that are currently managed by the first version of operating system 120 on computing device 206, and (C) deactivating the first version of operating system 120 and activating the second version of operating system 120 such that management of active processes 228(1)-(N) is transitioned from the first version of operating system 120 to the second version of operating system 120 without rebooting computing device 206.

Computing device 206 generally represents any type or form of physical computing device capable of reading computer-executable instructions and/or handling network traffic. In one example, computing device 206 may include and/or represent a router (such as a provider edge router, hub router, spoke router autonomous system boundary router, and/or area border router) that receives, routes, forwards, and/or otherwise handles network traffic. Additional examples of computing device 206 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing device. An apparatus for seamless and reversible in-service software upgrades may include and/or represent all or a portion of computing device 206.

Network 204 generally represents any medium or architecture capable of facilitating communication or data transfer. In one example, network 204 may facilitate communication between computing device 206 and computing device 202. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, computing device 202 may alternatively represent a portion of network 204 and/or be included in network 204.

Computing device 202 generally represents any type or form of computing device capable of reading computer-executable instructions. In one example, computing device 202 may include and/or represent a software-upgrade server that delivers in-service software upgrade 122 to computing device 206. Additional examples of computing device 202 include, without limitation, network devices, endpoint devices, laptops, tablets, desktops, servers, cellular phones, Personal Digital Assistants (PDAs), multimedia players, embedded systems, client devices, wearable devices (e.g., smart watches, smart glasses, etc.), gaming consoles, variations or combinations of one or more of the same, and/or any other suitable computing device.

Figure 3:
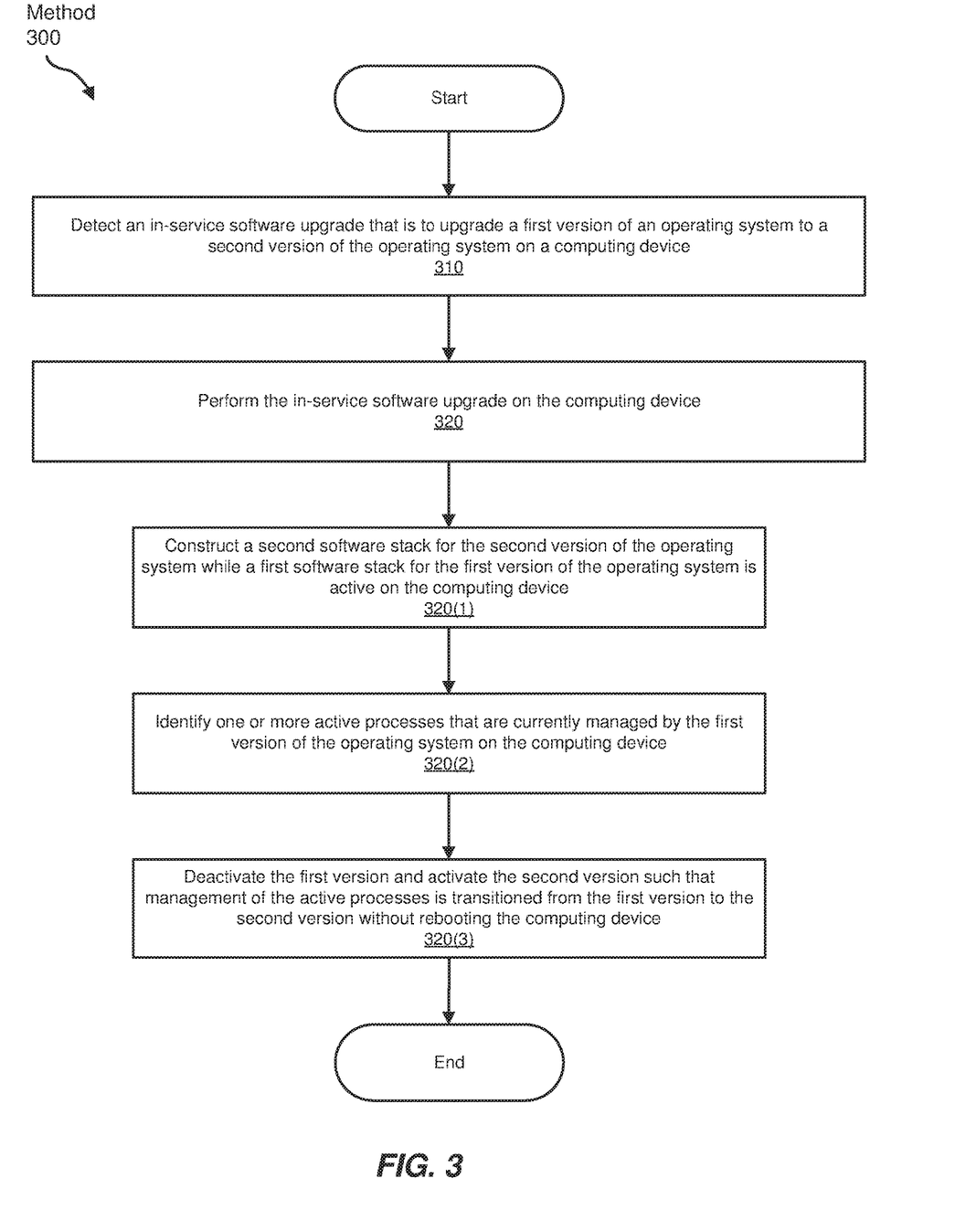
FIG. 3 is a flow diagram of an exemplary method for seamless and reversible in-service software upgrades.

FIG. 3 is a flow diagram of an exemplary computer-implemented method 300 for seamless and reversible in-service software upgrades. The steps shown in FIG. 3 may be performed by any suitable computer-executable code and/or computing system, including system 100 in FIG. 1, system 200 in FIG. 2, system 800 in FIG. 8, and/or variations or combinations of one or more of the same. In one example, each of the steps shown in FIG. 3 may represent an algorithm whose structure includes and/or is presented by multiple sub-steps, examples of which will be provided in greater detail below.

As illustrated in FIG. 3, at step 310 one or more of the systems described herein may detect an in-service software upgrade that is to upgrade a first version of an operating system to a second version of the operating system on a computing device. For example, detection module 104 may, as part of computing device 206 in FIG. 2, detect in-service software upgrade 122 that is to update and/or upgrade a first version of operating system 120 to a second version of operating system 120. In one example, the first version may represent an earlier and/or outdated version of operating system 120, and the second version may represent a newer and/or updated version of operating system 120. In this example, computing device 206 may obtain and/or download in-service software upgrade 122 from computing device 202 via network 204.

The systems described herein may perform step 310 in a variety of ways and/or contexts. In some examples, detection module 104 may detect in-service software upgrade 122 as it is downloaded and/or installed on computing device 206. For example, in-service software upgrade 122 may be programmed and/or configured to fix one or more bugs and/or improve the performance of operating system 120. In this example, computing device 202 may provide, deliver, and/or distribute in-service software upgrade 122 to computing device 206. As in-service software upgrade 122 arrives at computing device 206, detection module 104 may receive and/or detect in-service software upgrade 122.

As illustrated in FIG. 3, at step 320 one or more of the systems described herein may perform the in-service software upgrade on the computing device. For example, upgrade module 106 may, as part of computing device 206 in FIG. 2, perform in-service software pgrade 122 on computing device 206. In this example, in-service software upgrade 122 may update and/or upgrade operating system 120 from the first version to the second version. In this example, in-service software upgrade 122 may be implemented as computing device 206 continues handling and/or forwarding traffic as part of and/or in connection with network 204.

The systems described herein may perform step 320 in a variety of ways and/or contexts. As illustrated in FIG. 3, at step 320(1) one or more of the systems described herein may construct a second software stack for the second version of the operating system while a first software stack for the first version of the operating system is active n the computing device. For example, stack module 108 may, as part of computing device 206 in FIG. 2, construct software stack 126 for the second version of operating system 120 while software stack 124 for the first version of operating system 120 is active on computing device 206. In other words, software stack 124 of the first version of operating system 120 may be running on computing device 206. As part of running on computing device 206, software stack 124 may service and/or handle Input/Output (I/O) requests and/or manage file accesses on computing device 206.

Continuing with this example, stack module 108 may build and/or create software stack 126 independent of software stack 124. The building and/or creation of software stack 126 may take place and/or occur as software stack 124 actively runs on computing device 206. In some examples, software stacks 124 and 126 may include and/or share one or more filesystem components in common. Additionally or alternatively, software stacks 124 and 126 may differ from one another with respect to one or more filesystem components. In other words, some of the filesystem components included in software stacks 124 and 126 may be the same, and some of the filesystem components included in softwarestacks 124 and 126 may be different.

Figure 4:
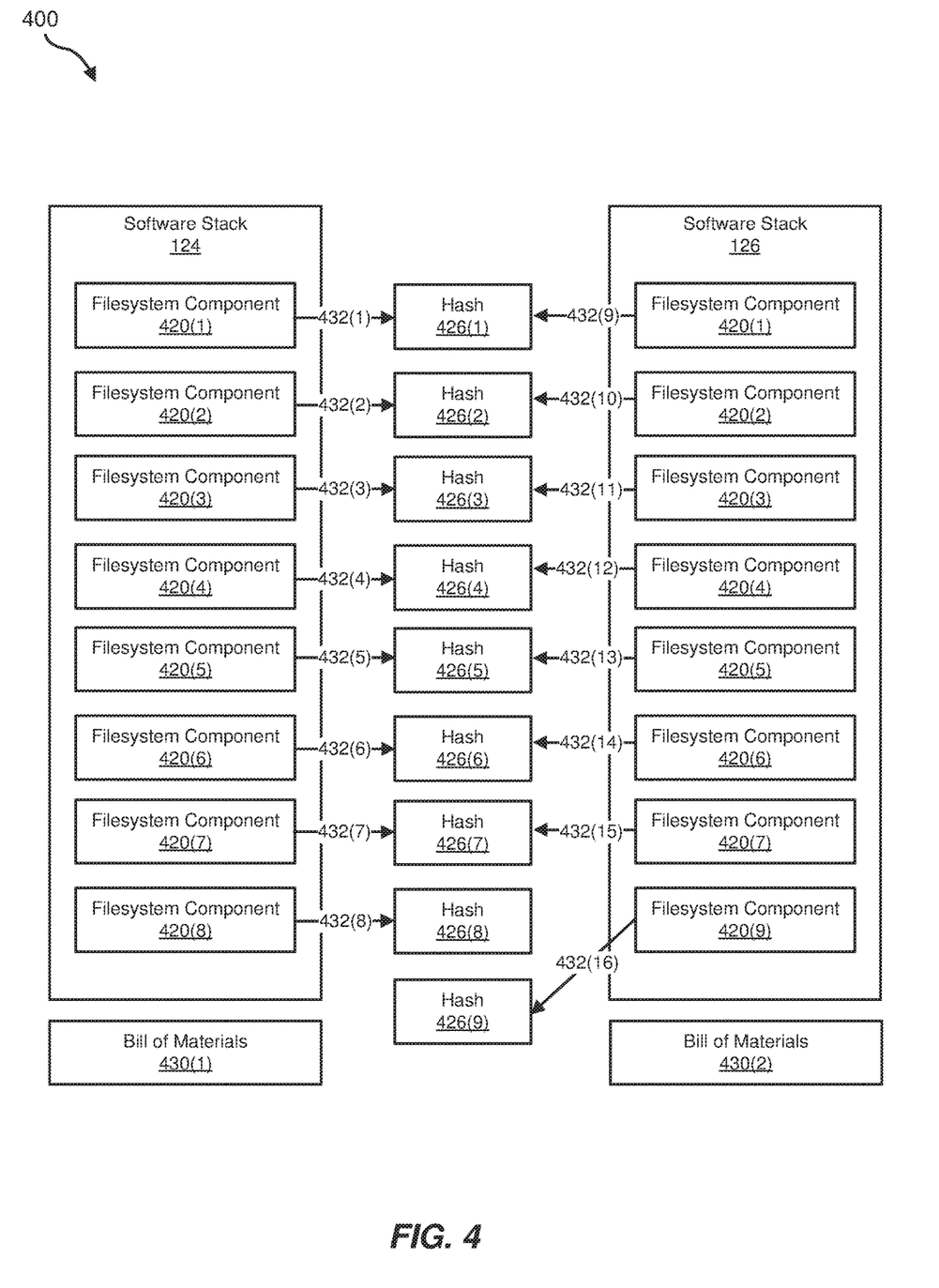
FIG. 4 is a block diagram of an exemplary system for seamless and reversible in-service software upgrades.

FIG. 4 illustrates an exemplary system 400 for seamless and reversible in-service software upgrades. As illustrated in FIG. 4, system 400 may include and/or represent software stack 124, software stack 126, and hashes 426(1), 426(2), 426(3), 426(4), 426(5), 426(6), 426(7), 426(8), and 426(9). In some examples, software stack 124 may include and/or represent filesystem components 420(1), 420(2), 420(3), 420(4), 420(5), 420(6), 420(7) and 420(8) responsible for performing and/or implementing the basic functions of the first version of operating system 120. In one example, each of filesystem components 420(1)-(8) may include and/or represent a filesystem-in-a-file. For example, each of file system components 420(1)-(8) may include and/or represent an immutable SQUASHES filesystem with an embedded manifest. In this example, the manifest may include and/or contain basic filesystem information (such as names, types, permissions, ownership, attributes, and/or access rights). The manifest may also include and/or contain scripts associated with the lifecycle of operating system 120 (such as firstboot, up, postinstall, reset, etc.). Alternatively, each of filesystem components 420(1)-(8) may include and/or represent a writable filesystem to which nothing is ever written.

In one example, stack module 108 may hash each of filesystem components 420(1)-(8). For example, stack module 108 may use Secure Flash Algorithm 1 (SHA1) checksums on filesystem components 420(1)-(8). By doing so, stack module 108 may create and/or generate hashes 426(1)-(8) from filesystem components 420(1)-(8), respectively. In this example, stack module 108 may connect and/or associate filesystem components 420(1)-(8) with hashes 426(1)-(8), respectively. These connections and/or associations may be implemented by way of hard links. For example, hard links 432(1), 432(2), 432(3), 432(4) 432(5), 432(6), 432(7), and 432(8) may connect and/or associate filesystem components 420(1)-(8) with hashes 426(1)-(8), respectively. Accordingly, hard link 432(1) may connect and/or associate filesystem component 420(1) with hash 426(1), and hard link 432(2) may connect and/or associate filesystem component 420(2) with hash 426(2).

Continuing with this example, software stack 124 in FIG. 4 may continue running on computing device 206 as stack module 108 constructs software stack 126 in FIG. 4. In other words, stack module 108 may stage software stack 126 while software stack 124 is running in preparation for the transition from software stack 124 to software stack 126. As illustrated in FIG. 4, software stack 126 may include and/or represent filesystem components 420(1), 420(2), 420(3) 420(4), 420(5) 420(6), 420(7), and 420(9) responsible for performing and/or implementing the basic functions of the second version of operating system 120. In one example, filesystem component 420(9) may include and/or represent a filesystem-in-a-file that replaces and/or upgrades filesystem component 420(8) from software stack 124. Accordingly, software stacks 124 and 126 may differ from one another in that software stack 124 includes filesystem component 420(8) and excludes filesystem component 420(9) whereas software stack 126 includes filesystem component 420(9) and excludes filesystem component 420(8). As a result, to facilitate the staging of software stack 126, stack module 108 may only need to replace filesystem component 420(8) with filesystem component 420(9).

In one example, stack module 108 may hash filesystem component 420(9). By doing so, stack module 108 may create and/or generate hash 426(9) from filesystem component 420(9). In this example, stack module 108 may connect and/or associate filesystem components 420(1)-(7) and 420 (9) with hashes 426(1)-(7) and 426(9), respectively. These connections and/or associations may be implemented by way of hard links. For example, hard links 432(9), 432(10), 432(11), 432(12) 432(13), 432(14), 432(15), and 432(16) may connect and/or associate filesystem components 420 (1)-(7) and 420(9) with hashes 426(1)-(7) and 426(9), respectively. Accordingly, hard link 432(9) may connect and/or associate filesystem component 420(1) with hash 426(1), and hard link 432(10) may connect and/or associate filesystem component 420(2) with hash 426(2).

In some examples, stack module 108 may construct and/or build software stacks from bills of materials. For example, stack module 108 may locate a bill of materials 430(1) that identifies filesystem components 420(1)-(8). In this example, stack module 108 may then construct and/or build software stack 124 based at least in part on bill of materials 430(1) such that software stack 124 includes and/or represents filesystem components 420(1)-(8).

In another example, stack module 108 may locate a bill of materials 430(2) that identifies filesystem components 420 (1)-(7) and 420(9). In this example, stack module 108 may then construct and/or build software stack 126 based at least in part on bill of materials 430(2) such that software stack 126 includes and/or represents filesystem components 420 (1)-(8). In one embodiment, bill of materials 430(2) and/or filesystem component 420(9) may originate from in-service software upgrade 122.

Alternatively, stack module 108 may construct and/or build software stack 126 based at least in part on bill of materials 430(1) and/or filesystem component 420(9). For example, stack module 108 may form software stack 126 from all the filesystem components identified in bill of materials 430(1) along with filesystem component 420(9) updated by way of in-service software upgrade 122.

As illustrated in FIG. 4, filesystem components 420(1)-(7) may be shared by software stacks 124 and 126 using hard links. As will be explained in greater detail below, a union filesystem (such as UNIONFS and/or USWITCH) may integrate read-only filesystem components into a single read-only filesystem root. In some examples, this union filesystem may implement a union mount that facilitates combining multiple directories and/or filesystem components together such that they appear to form a single directory and/or file system component.

As illustrated in FIG. 3, at step 320(2) one or more of the systems described herein may identify one or more processes that are currently managed by the first version of the operating system on the computing device. For example, identification module 110 may, as part of computing device 206 in FIG. 2, identify one or more active processes 228 (1)-(N) that are currently managed by the first version of operating system. In one example, each of active processes 228(1)-(N) may include and/or represent an execution instance of an underlying program.

In some examples, identification module 110 may generate and/or obtain a run-time report that identifies all the active processes currently running on computing device 206. In one example, the run-time report may identify and/or indicate one or more of active processes 228(1)-(N) that are or will be affected by the transition from the first version of operating system 120 to the second version of operating system 120. Additionally or alternatively, the run-time report may identify and/or indicate one or more of active processes 228(1)-(N) that are or will be unaffected by the transition from the first version of operating system 120 to the second version of operating system 120. Accordingly, the run-time report may identify and/or indicate which of active processes 228(1)-(N) are implicated by in-service software upgrade 122 and/or which of active processes 228(1)-(N) are not implicated by in-service software upgrade 122.

Figure 6:
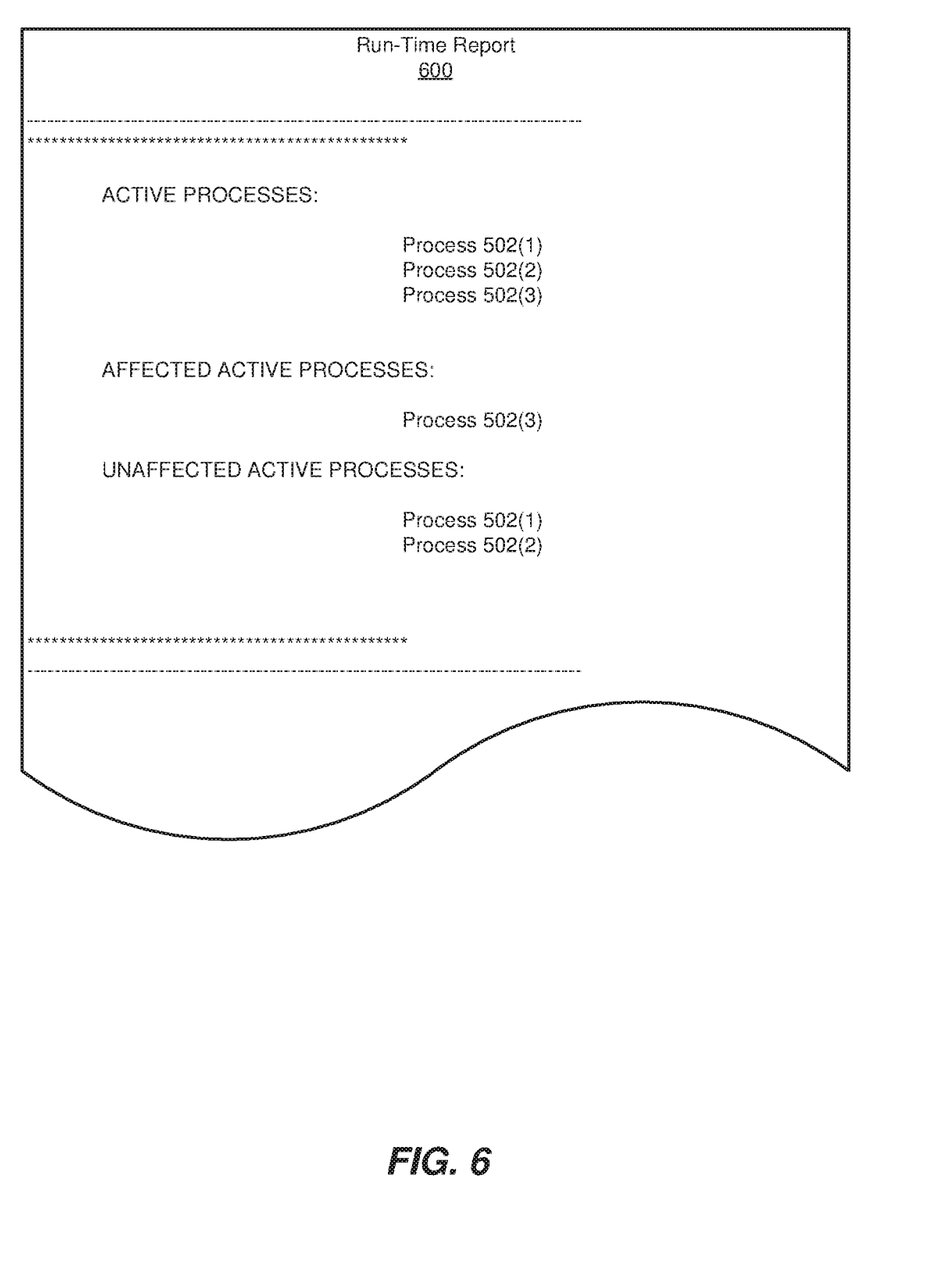
FIG. 6 is an illustration of an exemplary run-time report that identifies active processes running on a computing device during an in-service software upgrade.

As specific example, identification module 110 may generate and/or obtain a run-time report 600 in FIG. 6. As illustrated in FIG. 6, run-time report 600 may identify processes 502(1) 502(2), and 502(3) as being currently active on computing device 206. In this example, run-time report 600 may identify processes 502(1) and 502(2) as being unaffected by the transition from the first version of operating system 120 to the second version of operating system 120. In addition, run-time report 600 may identify process 502(3) as being affected by the transition from the first version of operating system 120 to the second version of operating system 120. Although not illustrated in this way in FIG. 6, run-time report 600 may also identify various other attributes and/or features of computing device 206 at the time of the transition. For example, run-time report 600 may also identify one or more filesystem components that remain unchanged by the transition from the first version of operating system 120 to the second version of operating system 120. Additionally or alternatively, run-time report 600 may identify one or more filesystem components that change as a result of the transition from the first version of operating system 120 to the second version of operating system 120.

As illustrated in FIG. 3, at step 320(3) one or more of the systems described herein may deactivate the first version of the operating system and activate the second version of the operating system such that management of the active processes is transitioned from the first version to the second version. For example, activation module 112 may, as part of computing device 206 in FIG. 2, deactivate the first version of operating system 120 and activate the second version of operating system 120. In one example, this combination of deactivation and activation may cause the management of active processes 502(1)-(3) to be transitioned from the first version of operating system 120 to the second version of operating system 120.

In some examples, prior to the completion of the transition, software stack 124 of the first version of operating system 120 may handle and/or service all I/O requests and/or file accesses on computing device 206. In these examples after the completion of the transition, software stack 126 of the second version of operating system 120 may handle and/or service all I/O requests and/or file accesses on computing device 206.

In some examples, identification module 110 may identify certain files within filesystem components 420(1)-(8) being accessed or having been accessed by one or more active processes. Under certain conditions, one or more of these files may need to be closed and/or reopened to effectuate the transition from the first version to the second version successfully. For example, if an in-use file itself is changed by the transition, activation module 112 may force that file to close and then reopen to ensure proper transitioning from the first version to the second version. In this example, if another in-use file itself remains unchanged throughout the transition, and the filesystem component that includes the in-use file remains unchanged throughout the transition, activation module 112 may allow that file to remain open throughout the transition.

In one example, identification module 110 may identify, store, and/or retain information and/or statistics about files that were opened and closed in connection with software stack 124 and/or software stack 126. For example, an active process may open a file, consume certain data from the file, and then close the file. In this example, identification module 110 may identify, store, and/or retain information and/or statistics that record the opening, consuming data from, and/or closing that file. In one embodiment, a union filesystem (such as UNIONFS and/or USWITCH) may report information and/or statistics about active open file as well as other files that have been opened and then closed prior to transition.

In another example, if a filesystem component changes in the transition, but an in-use file within that filesystem component remains unchanged throughout the transition, activation module 112 may force that file to close and then reopen to ensure proper transitioning from the first version to the second version. In this example, if none of the files used by an active process are affected by the transition, the active process itself may be unaffected by the transition. As a result, activation module 112 may allow the active process to remain open and/or running throughout the transition—without necessitating a restart. However, if a filesystem component changes in the transition, and an in-use file within that filesystem component changes in the transition, activation module 112 may force that file to close, restart the active process using that file, and then reopen that file to ensure proper transitioning from the first version to the second version.

In some examples, to perform in-service software upgrade 122, activation module 112 may stop all active processes that are affected by the transition from the first version of operating system 120 to the second version of operating system 120. For example, activation module 112 may stop any of active processes 228(1)-(N) that are affected by the transition. In this example, the active affected processes may include all those that have historic or current references to files that are different between the old and new versions of the software stack. However, in this example, activation module 112 may maintain alive without interruption and/or stoppage any of active processes 228(1)-(N) that are unaffected by the transition.

Upon stopping all active processes that are affected by the transition, activation module 112 may deactivate the first version of operating system 120 and activate the second version of operating system 120. By doing so, activation module 112 may ensure that all subsequent file accesses are handled and/or serviced by software stack 126, as opposed to software stack 124. Activation module 112 may then restart all the affected active processes that were stopped and/or interrupted to effectuate the transition.

Figure 5:
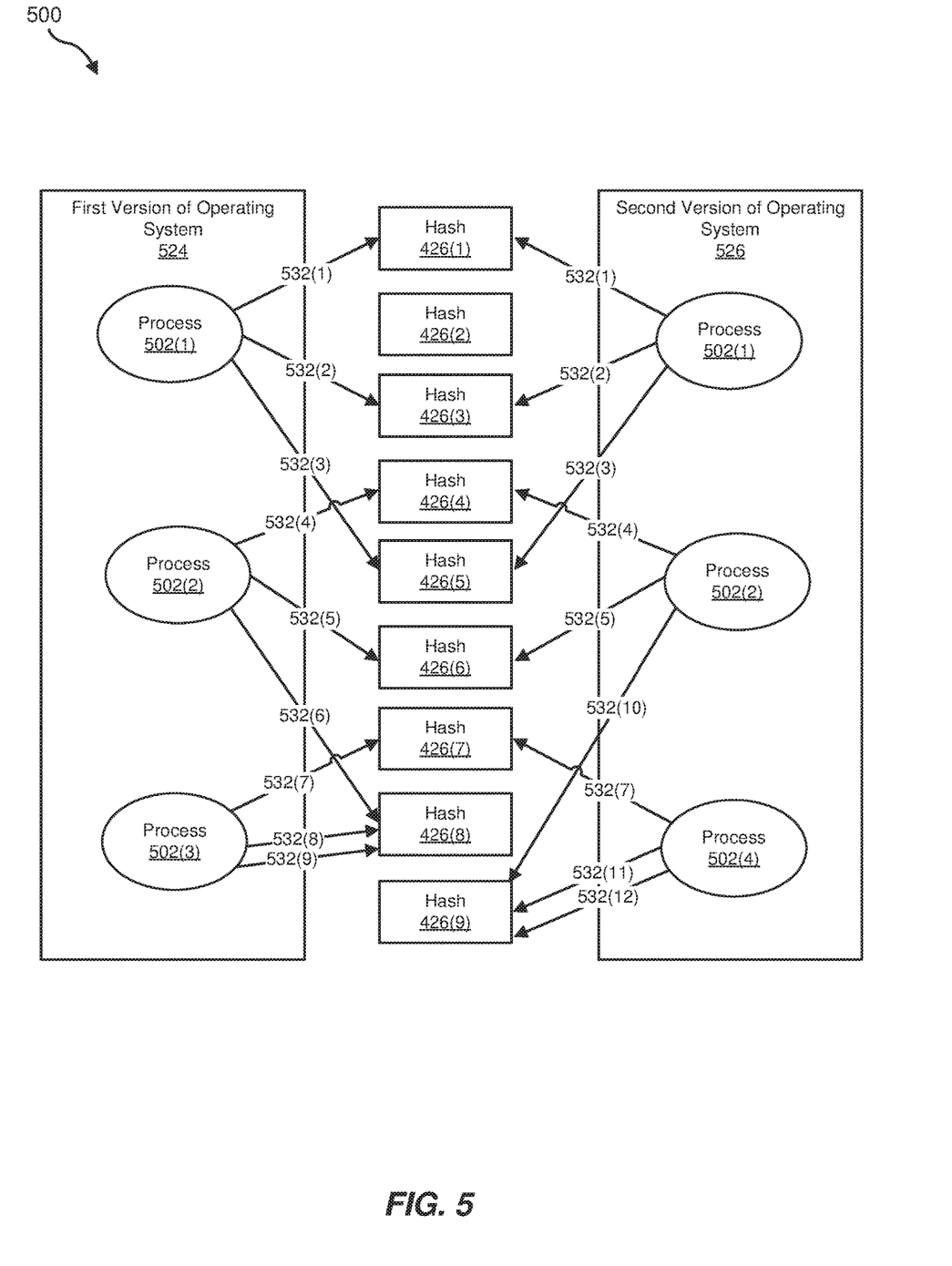
FIG. 5 is a block diagram of an exemplary system for seamless and reversible in-service software upgrades.

FIG. 5 illustrates an exemplary system 500 for seamless and reversible in-service software upgrades. As illustrated in FIG. 5, system 500 may include and/or represent a first version of operating system 524, a second version of operating system 526, and hashes 426(1)-(9). In some examples, first version of operating system 524 may include, execute, and/or run active processes 502(1), 502(2), and 502(3) at the time of the transition initiated by in-service software upgrade 122. In one example, active process 502(1) may be using and/or accessing one or more files included in the filesystem components represented by hashes 426(1), 426(3), and 426(5) at the time of the transition. These file accesses may be facilitated and/or achieved by way of hard links 532(1), 532(2), and 523(3), respectively.

Continuing with this example, the files used and/or accessed by active process 502(1) may remain unchanged throughout the transition. In addition, the filesystem components represented by hashes 426(1), 426(3), and 426(5) may remain unchanged throughout the transition. Because, in this example, these files and their corresponding filesystem components remained unchanged throughout the transition, activation module 112 may allow these files to remain open—without necessitating a close—throughout the transition. Similarly, activation module 112 may also allow active process 502(1) to remain open and/or running—without necessitating a restart—throughout the transition. In other words, activation module 112 may maintain active process 502(1) alive throughout the transition.

In one example active process 502(2) may be sing and/or accessing one or more files included in the filesystem components represented by hashes 426(4), 426(6), and 426(8) at the time of the transition. These file accesses may be facilitated and/or achieved by way of hard links 532(4), 532(5), and 523(6), respectively. Continuing with this example, the files used and/or accessed by active process 502(2) may remain unchanged throughout the transition. In addition, the filesystem components represented by hashes 426(4) and 426(6) may remain unchanged throughout the transition. Because in this example, these files and their corresponding filesystem components remained unchanged throughout the transition, activation module 112 may allow these files to remain open—without necessitating a close—throughout the transition.

However, in this example, the filesystem component represented by hash 426(8) may have changed in the transition even though the file used and/or accessed by process 502(2) remained unchanged. As a result, activation module 112 may force the file used and/or accessed by active process 502(2) within hash 426(8) to close and then reopen during the transition. Despite the closing and reopening of this file, active process 502(2) may be unaffected by the transition. For this reason, activation module 112 may also allow active process 502(2) to remain open and/or running—without necessitating a restart—throughout the transition. In other words, activation module 112 may maintain active process 502(2) alive throughout the transition.

In one example, active process 502(3) may be using and/or accessing one or more files included in the filesystem components represented by hashes 426(7) and 426(8) at the time of the transition. These file accesses may be facilitated and/or achieved by way of hard links 532(7), 532(8), and 523(9), respectively. Continuing with this example, the files used and/or accessed by way of hard links 532(7) and 532(8) may remain unchanged throughout the transition. However, the file used and/or accessed by way of hard link 532(9) may have changed in the transition.

Accordingly, while the filesystem component represented by hash 426(7) may remain unchanged throughout the transition, the filesystem component represented by hash 426(8) may have changed in the transition. As a result, activation module 112 may allow the file used and/or accessed by way of hard link 532(7) to remain open—without necessitating a close—throughout the transition. However, because the filesystem component represented by hash 426(8) may have changed in the transition, activation module 112 may force the file used and/or accessed by way of hard link 532(8) to close and then reopen during the transition.

In addition, because the file used and/or accessed by way of hard link 532(9) may have changed in the transition, activation module 112 may force the file used and/or accessed by way of hard link 532(9) to close and then reopen during the transition. Moreover, because that file is used and/or accessed by active process 502(3) at the time of the transition, active process 502(3) may be affected by the transition. For this reason, activation module 112 may force process 502(3) to close after that file has closed and then restart before that file is reopened. In other words, activation module 112 may kill process 502(3) after that file has closed.

In some examples, stack module 108 may replace filesystem component 420(8) with filesystem component 420(9) as part of the transition from first version of operating system 524 to second version of operating system 526. Accordingly, stack module 108 may hash filesystem component 420(9). By doing so, stack module 108 may create and/or generate hash 426(9) from filesystem components 420(9). In this example, stack module 108 may replace hash 426(8) with hash 426(9) as part of the transition from first version of operating system 524 to second version of operating system 526. This connection and/or association may be implemented by way of hard links. For example, hard links 532(10), 532(11), and 532(12) may lead to files included in filesystem component 420(9) by way of hash 426(9).

As illustrated in FIG. 5, second version of operating system 526 may include, execute, and/or run active processes 502(1), 502(2), and 502(4) after completion of the transition initiated by in-service software upgrade 122. Because, in this example, none of the files used and/or accessed by active process 502(1) changed in the transition, activation module 112 may allow active process 502(1) to continue running without interruption throughout the transition. Similarly, because none of the files used and/or accessed by active process 502(2) changed in the transition, activation module 112 may allow active process 502(2) to continue running without interruption throughout the transition. However, because the file used and/or accessed by active process 502(3) via hard link 532(9) changed in the transition, activation module 112 may force active process 502(3) to close and then reopen as active process 502(4) to facilitate proper transitioning from first version of operating system 524 to second version of operating system 526.

In one example, after the transition, active process 502(2) may use and/or access one of the unchanged files included in the filesystem component represented by hash 426(9) via hard link 532(10). In this example, after the transition, active process 502(4) may use and/or access another one of the unchanged files included in the filesystem component represented by hash 426(9) via hard link 532(11). In addition, active process 502(4) may use and/or access the changed file included in the filesystem component represented by hash 426(9) via hard link 532(12).

In some examples, one or more of modules 102 may store, hold, and/or maintain file descriptors that facilitate access to the actual files within the various filesystem components. For example, stack module 108 may create and/or generate SHA1 checksums that reference and/or are used to identify the specific files within the filesystem components.

Figure 7:
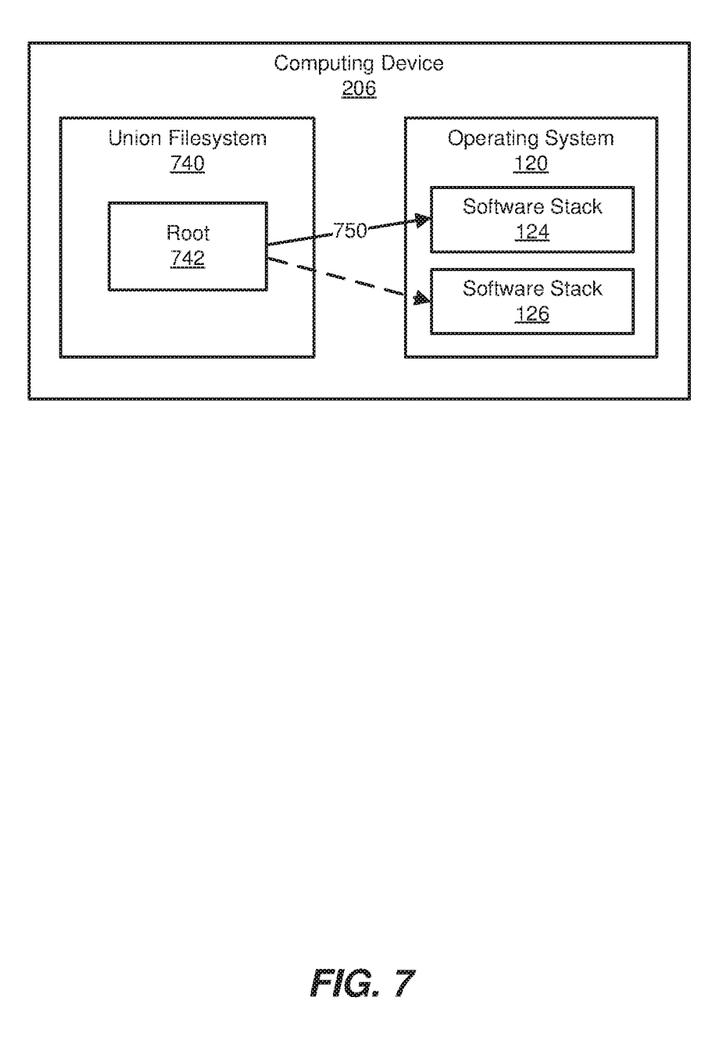
FIG. 7 is a block diagram of an exemplary system for seamless and reversible in-service software upgrades.

In some examples, computing device 206 may include and/or implement a union filesystem 740 in FIG. 7. As illustrated in FIG. 7, union filesystem 740 may include and/or implement a root 742. In one example, root 742 may include and/or represent a root directory and/or a root filesystem.

In one example, stack module 108 may stage software stack 126 while software stack 124 is running on computing device 206. In this example, to facilitate the transition initiated by in-service software upgrade 122, activation module 112 may switch root 742 of union filesystem 740 from software stack 124 to software stack 126. Accordingly, root 742 may engage software stack 126 such that all I/O requests and/or file accesses are handled and/or serviced by software stack 126, as opposed to software stack 124, after the transition.

In some examples one or more of modules 102 may maintain various versions of operating system 120 in memory simultaneously. For example, after completion of the transition, stack module 108 may maintain and/or preserve software stack 124 in memory to facilitate rolling back and/or reversing in-service software upgrade 122 for one reason or another. In this example, to facilitate such a rollback and/or reversal, activation module 112 may switch root 742 of union filesystem 740 from software stack 126 back to software stack 124.

In one example, one or more of modules 102 may perform and/or implement one or more additional in-service software upgrades subsequent to in-service software upgrade 122. In this example, stack module 108 may maintain and/or preserve software stack 124 and software stack 126 in memory to facilitate rolling back and/or reversing those additional in-service software upgrades for one reason or another. To facilitate such a rollback and/or reversal, activation module 112 may switch root 742 of union filesystem 740 from a subsequent software stack back to software stack 124 or 126.

Figure 8:
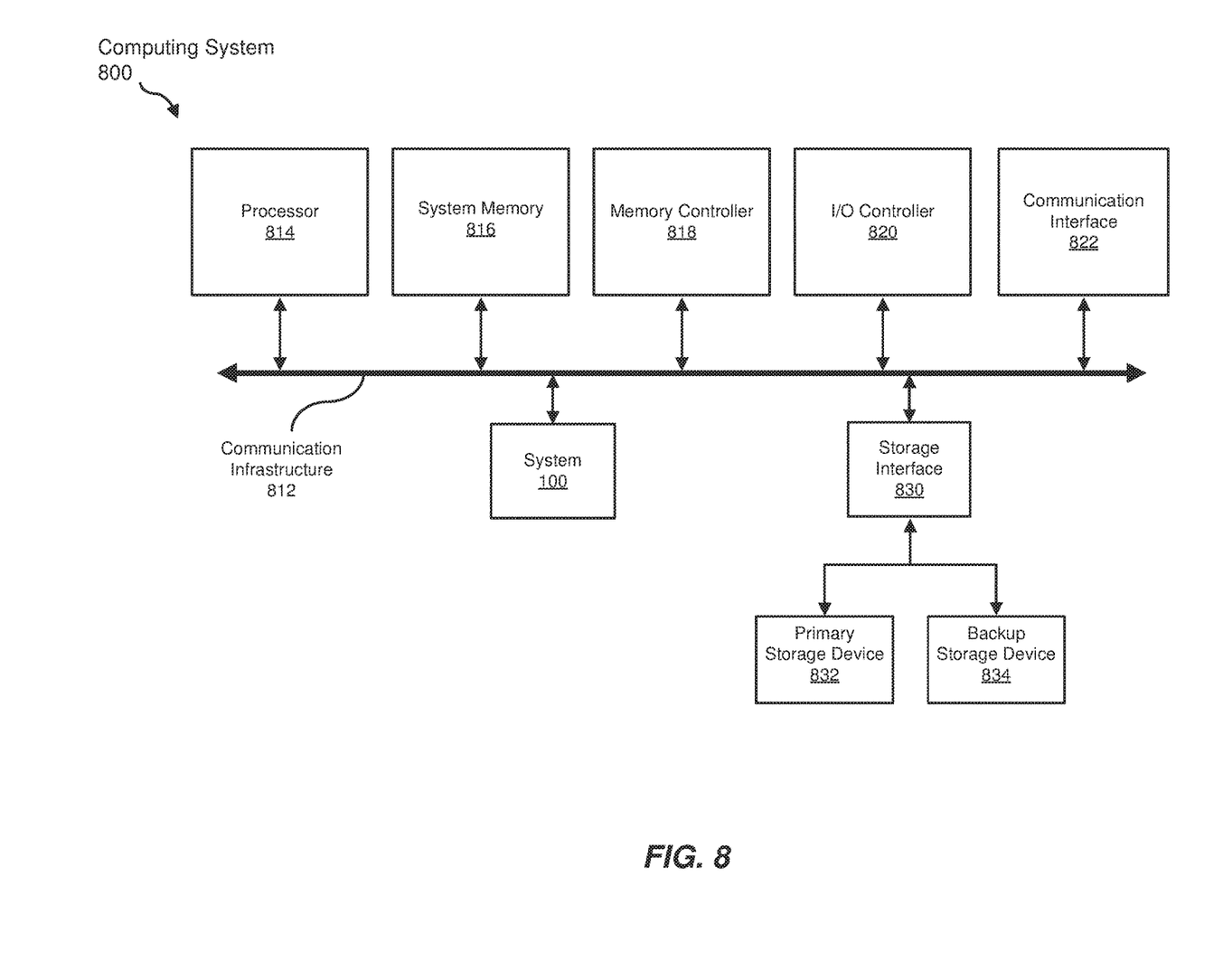
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC) a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   detecting an in-service software upgrade that is to upgrade a first version of an operating system to a second version of the operating system on a computing device;
   performing the in-service software upgrade on the computing device by:
   constructing a second software stack for the second version of the operating system while a first software stack for the first version of the operating system is active on the computing device, wherein the first software stack and the second software stack:
   share one or more filesystem components in common; and
   differ from one another with respect to at least one filesystem component;
   staging the second software stack while the first software stack is running on the computing device;
   identifying one or more active processes that are currently managed by the first version of the operating system on the computing device;
   deactivating the first version of the operating system and activating the second version of the operating system such that management of the active processes is transitioned from the first version of the operating system to the second version of the operating system without rebooting the computing device; and
   switching a root of a union filesystem on the computing device from the first software stack to the second software stack to facilitate the transition.

2. The method of claim 1, wherein identifying one or more active processes that are currently managed by the first version of the operating system comprises generating a run-time report that identifies the active processes currently running on the computing device.

3. The method of claim 2, wherein the run-time report identifies:
an active process that is affected by the transition from the first version of the operating system to the second version of the operating system; and
an active process that is unaffected by the transition from the first version of the operating system to the second version of the operating system.

4. The method of claim 3, wherein activating the second version of the operating system comprises:
restarting the affected active process during the transition from the first version of the operating system to the second version of the operating system; and
maintaining the unaffected active process alive without a restart during the transition.

5. The method of claim 3, wherein the run-time report further identifies at least one of:
a filesystem component that remains unchanged by the transition from the first version of the operating system to the second version of the operating system; and
a filesystem component that changes as a result of the transition from the first version of the operating system to the second version of the operating system.

6. The method of claim 5, wherein:
the unaffected active process accesses a file that:
is included in the changed filesystem component; and
remains unchanged by the transition; and
activating the second version of the operating system comprises:
closing the file during the transition;
reopening the file during the transition; and
maintaining the unaffected active process alive without a restart during the transition.

7. The method of claim 5, wherein:
the affected active process accesses a file that:
is included in the changed filesystem component; and
changes as a result of the transition; and
activating the second version of the operating system comprises:
closing the file during the transition;
upon closing the file, restarting the affected active process during the transition; and
upon restarting the affected active process, reopening the file during the transition.

8. The method of claim 1, wherein the first software stack and the second software stack are both:
immutable; and
maintained in memory on the computing device after the transition.

9. The method of claim 1, wherein performing the in-service software upgrade on the computing device comprises:
stopping all active processes that are affected by the transition from the first version of the operating system to the second version of the operating system;
upon stopping all the affected active processes, deactivating the first version of the operating system and activating the second version of the operating system such that:
subsequent file accesses are handled by the second software stack; and
the subsequent file accesses are not handled by the first software stack; and
upon activating the second version of the operating system, restarting all the affected active process that were stopped.

10. The method of claim 1, wherein constructing the second software stack comprises:
locating a bill of materials that identifies all filesystem components included in the first software stack; and
constructing the second software stack based at least in part on the bill of materials that identifies all the filesystem components included in the first software stack.

11. A system comprising:
a detection module, stored in memory, that detects an in-service software upgrade that is to upgrade a first version of an operating system to a second version of the operating system on a computing device;
an upgrade module, stored in memory, that performs the in-service software upgrade on the computing device by way of:
a stack module, stored in memory, that:
constructs a second software stack for the second version of the operating system while a first software stack for the first version of the operating system is active on the computing device, wherein the first software stack and the second software stack:
share one or more filesystem components in common; and
differ from one another with respect to at least one filesystem component; and
stages the second software stack while the first software stack is running on the computing device;
an identification module, stored in memory, that identifies one or more active processes that are currently managed by the first version of the operating system on the computing device;
an activation module, stored in memory, that:
deactivates the first version of the operating system and activates the second version of the operating system such that management of the active processes is transitioned from the first version of the operating system to the second version of the operating system without rebooting the computing device; and
switches a root of a union filesystem on the computing device from the first software stack to the second software stack to facilitate the transition; and
at least one physical processing device configured to execute the detection module, the upgrade module, the stack module, the identification module, and the activation module.

12. The system of claim 11, wherein the identification module generates a run-time report that identifies the active processes currently running on the computing device.

13. The system of claim 12, wherein the run-time report identifies:
an active process that is affected by the transition from the first version of the operating system to the second version of the operating system; and
an active process that is unaffected by the transition from the first version of the operating system to the second version of the operating system.

14. The system of claim 13, wherein the activation module:
    restarts the affected active process during the transition from the first version of the operating system to the second version of the operating system; and
    maintains the unaffected active process alive without a restart during the transition.

15. The system of claim 13, wherein the run-time report further identifies at least one of:
    a filesystem component that remains unchanged by the transition from the first version of the operating system to the second version of the operating system; and
    a filesystem component that changes as a result of the transition from the first version of the operating system to the second version of the operating system.

16. The system of claim 15, wherein:
    the unaffected active process accesses a file that:
        is included in the changed filesystem component; and
        remains unchanged by the transition; and
    the activation module comprises:
        closes the file during the transition;
        reopens the file during the transition; and
        maintains the unaffected active process alive without a restart during the transition.

17. The system of claim 15, wherein:
    the affected active process accesses a file that:
        is included in the changed filesystem component; and
        changes as a result of the transition; and
    the activation module comprises:
        closes the file during the transition;
        upon closing the file, restarts the affected active process during the transition; and
        upon restarting the affected active process, reopens the file during the transition.

18. The system of claim 11, wherein the first software stack and the second software stack are both:
    immutable; and
    maintained in memory on the computing device after the transition.

19. An apparatus comprising:
    at least one storage device that stores a first version of an operating system that runs on a computing device;
    at least one physical processor communicatively coupled to the storage device, wherein the physical processor:
        detects an in-service software upgrade that is to upgrade the first version of the operating system to a second version of the operating system on the computing device;
        performs the in-service software upgrade on the computing device by:
            constructing a second software stack for the second version of the operating system while a first software stack for the first version of the operating system is active on the computing device, wherein the first software stack and the second software stack:
                share one or more filesystem components in common; and
                differ from one another with respect to at least one filesystem component;
            staging the second software stack while the first software stack is running on the computing device;
            identifying one or more active processes that are currently managed by the first version of the operating system on the computing device;
            deactivating the first version of the operating system and activating the second version of the operating system such that management of the active processes is transitioned from the first version of the operating system to the second version of the operating system without rebooting the computing device; and
        switching a root of a union filesystem on the computing device from the first software stack to the second software stack to facilitate the transition.

* * * * *